United States Patent
Yamada

(10) Patent No.: US 10,800,911 B2
(45) Date of Patent: Oct. 13, 2020

(54) HETEROPHASIC PROPYLENE POLYMERIZATION MATERIAL

(71) Applicant: Sumitomo Chemical Company, Limited, Tokyo (JP)

(72) Inventor: Hidekazu Yamada, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 23 days.

(21) Appl. No.: 16/320,761

(22) PCT Filed: Aug. 1, 2017

(86) PCT No.: PCT/JP2017/027903
§ 371 (c)(1),
(2) Date: Jan. 25, 2019

(87) PCT Pub. No.: WO2018/025863
PCT Pub. Date: Feb. 8, 2018

(65) Prior Publication Data
US 2019/0161605 A1    May 30, 2019

(30) Foreign Application Priority Data

Aug. 3, 2016  (JP) .................................. 2016-153178

(51) Int. Cl.
| | |
|---|---|
| *C08L 23/16* | (2006.01) |
| *B09B 1/00* | (2006.01) |
| *C08L 23/10* | (2006.01) |
| *C08L 23/08* | (2006.01) |
| *C08J 5/18* | (2006.01) |
| *E02D 31/00* | (2006.01) |

(52) U.S. Cl.
CPC .............. *C08L 23/16* (2013.01); *B09B 1/00* (2013.01); *C08J 5/18* (2013.01); *C08L 23/08* (2013.01); *C08L 23/10* (2013.01); *E02D 31/004* (2013.01); *C08J 2323/16* (2013.01); *C08J 2423/16* (2013.01); *C08L 2205/025* (2013.01); *C08L 2207/02* (2013.01)

(58) Field of Classification Search
CPC ........ C08L 23/10; C08L 23/142; C08L 23/16; C08L 23/08; C08L 2205/025; C08L 2308/00; C08L 2207/02; C08L 2205/03; C08F 210/06; C08F 110/06; C08F 11/6492; C08F 11/6465; C08F 2500/17; C08F 2500/12; C08J 5/18; C08J 2423/16; E02D 31/004; B01B 1/00

See application file for complete search history.

(56) References Cited

U.S. PATENT DOCUMENTS

| | | | |
|---|---|---|---|
| 2014/0088255 A1 | 3/2014 | Shimano et al. | |
| 2014/0357771 A1* | 12/2014 | Tranninger et al. .... | C08F 2/001 524/210 |
| 2015/0057408 A1* | 2/2015 | Eckmayr et al. ....... | C08L 23/10 524/528 |

FOREIGN PATENT DOCUMENTS

| | | |
|---|---|---|
| EP | 2147026 A1 | 1/2010 |
| EP | 2615135 A1 | 7/2013 |
| JP | 19316283 A | 12/1997 |
| JP | 2008081644 A | 4/2008 |
| JP | 2009013333 A | 1/2009 |
| JP | 2009203257 A | 9/2009 |
| JP | 2014077131 A | 5/2014 |
| WO | 200868113 A1 | 6/2008 |
| WO | 2013092615 A1 | 6/2013 |

OTHER PUBLICATIONS

Extended European Search Report dated Feb. 27, 2020 in EP Application No. 17836966.6.

* cited by examiner

*Primary Examiner* — Nathan M Nutter
(74) *Attorney, Agent, or Firm* — Panitch Schwarze Belisario & Nadel LLP

(57) ABSTRACT

A heterophasic propylene polymerization material containing a propylene homopolymer component or a specific propylene copolymer component, and a specific ethylene-α-olefin copolymer component, in which (i) the amount of the xylene-soluble component is 40% by weight or more, (ii) the limiting viscosity $[\eta]_{CXIS}$ of the xylene-insoluble component is 1.50 dL/g or more, (iii) the ratio of the limiting viscosity $[\eta]_{CXS}$ of the xylene-soluble component to the limiting viscosity $[\eta]_{CXIS}$ of the xylene-insoluble component is 1.5 or less, and (iv) the content of monomer units derived from ethylene and α-olefins having 4 to 12 carbon atoms in the xylene-insoluble component is 6% by weight or more.

4 Claims, No Drawings

HETEROPHASIC PROPYLENE POLYMERIZATION MATERIAL

CROSS-REFERENCE TO RELATED APPLICATION

This application is a Section 371 of International Application No. PCT/JP2017/027903, filed Aug. 1, 2017, which was published in the Japanese language on Feb. 8, 2018, under International Publication No. WO 2018/025863 A1, which claims priority under 35 U.S.C. § 119(b) to Japanese Application No. 2016-153178, filed Aug. 3, 2016, the disclosures of which are incorporated herein by reference in their entirety.

TECHNICAL FIELD

The present invention relates to a heterophasic propylene polymerization material which is excellent in flexibility and low thermal shrinkability and has a high tensile property.

BACKGROUND ART

Polypropylene resins are widely utilized in the fields of automobile parts, household electrical appliances, food and medical containers, building and civil engineering materials and the like, taking advantage of the features thereof. For example, Patent Document 1 and Patent Document 2 disclose heterophasic propylene polymerization materials excellent in flexibility.

PRIOR ART DOCUMENT

Patent Document

Patent Document 1: European Patent No. 2147026
Patent Document 2: International Publication

SUMMARY OF THE INVENTION

Problem to be Solved by the Invention

However, the heterophasic propylene polymerization materials described in Patent Document 1 and Patent Document 2 are not sufficiently satisfactory in any one of flexibility, thermal shrinkability and a tensile property.

The present invention has been made in view of the above-described problem, and the object of the present invention is to provide a heterophasic propylene polymerization material capable of obtaining a molded body excellent in flexibility, having small anisotropy of thermal shrinkage ratio and having high tensile ultimate strength and high tensile ultimate elongation.

Means for Solving the Problem

The present invention provides the followings.

[1] A heterophasic propylene polymerization material comprising a propylene homopolymer (I-1) or the following propylene copolymer (I-2), and the following ethylene-α-olefin copolymer (II), the heterophasic propylene polymerization material satisfying all of the following requirements (i) to (iv):

(i) the amount of the xylene-soluble component in the heterophasic propylene polymerization material is 40% by weight or more, providing that the total weight of the heterophasic propylene polymerization material is taken as 100% by weight;

(ii) the limiting viscosity $[\eta]_{CXIS}$ of the xylene-insoluble component in the heterophasic propylene polymerization material is 1.50 dL/g or more;

(iii) the ratio of the limiting viscosity $[\eta]_{CXS}$ of the xylene-soluble component in the heterophasic propylene polymerization material to the limiting viscosity $[\eta]_{CXIS}$ of the xylene-insoluble component therein ($[\eta]_{CXS}/[\eta]_{CXIS}$) is 1.5 or less; and (iv) the content of monomer units derived from ethylene and α-olefins having 4 to 12 carbon atoms in the xylene-insoluble component in the heterophasic propylene polymerization material is 6% by weight or more, providing that the total weight of the xylene-insoluble component is taken as 100% by weight:

propylene copolymer (I-2):
a propylene copolymer comprising a monomer unit derived from propylene and a monomer unit derived from at least one olefin selected from the group consisting of ethylene and α-olefins having 4 to 12 carbon atoms,
wherein the content of the monomer unit derived from at least one olefin selected from the group consisting of ethylene and α-olefins having 4 to 12 carbon atoms is 0.01% by weight or more and less than 20% by weight, provided that the total weight of the propylene copolymer (I-2) is taken as 100% by weight;

ethylene-α-olefin copolymer (II):
an ethylene-α-olefin copolymer comprising a monomer unit derived from ethylene and a monomer unit derived from at least one olefin selected from the group consisting of propylene and α-olefins having 4 to 12 carbon atoms,
wherein the content of the monomer unit derived from ethylene is 20% by weight to 80% by weight, provided that the total weight of the ethylene-α-olefin copolymer component (II) is taken as 100% by weight.

[2] The heterophasic propylene polymerization material according to [1], wherein the content of the monomer unit derived from ethylene in the xylene-soluble component is 20% by weight to 40% by weight, provided that the total weight of the xylene-soluble component is taken as 100% by weight.

[3] The heterophasic propylene polymerization material according to [1] or [2], wherein the limiting viscosity $[\eta]_{CXIS}$ of the xylene-insoluble component is 2.1 dL/g or more.

[4] A water-impermeable sheet comprising the heterophasic propylene polymerization material according to any one of [1] to [3].

Effects of the Invention

According to the present invention, a heterophasic propylene polymerization material capable of obtaining a molded body excellent in flexibility, having small anisotropy of thermal shrinkage ratio and having high tensile ultimate strength and high tensile ultimate elongation can be provided.

MODES FOR CARRYING OUT THE INVENTION

<Constitution of Heterophasic Propylene Polymerization Material>

The heterophasic propylene polymerization material of the present invention is a propylene polymerization material comprising a propylene homopolymer (I-1) or a propylene copolymer (I-2), and an ethylene-α-olefin copolymer (II). The propylene homopolymer (I-1) and the propylene copolymer component (I-2) are collectively referred to as "propylene polymer component (I)".

The propylene homopolymer (I-1) is a homopolymer component composed of a monomer unit derived from propylene.

In the present specification, "monomer unit" denotes a structural unit derived from a monomer.

The propylene copolymer (I-2) is a propylene copolymer component comprising a monomer unit derived from propylene and a monomer unit derived from at least one olefin selected from the group consisting of ethylene and α-olefins having 4 to 12 carbon atoms, wherein the content of the monomer unit derived from at least one olefin selected from the group consisting of ethylene and α-olefins having 4 to 12 carbon atoms is 0.01% by weight or more and less than 20% by weight, with respect to 100% by weight of the total weight of the propylene copolymer (I-2). The content of the monomer unit derived from at least one olefin is preferably 0.1% by weight or more and less than 15% by weight, more preferably 1% by weight or more and less than 10% by weight.

The propylene copolymer (I-2) includes, for example, (1) a propylene-ethylene copolymer in which the content of a monomer unit derived from propylene is 85% by weight or more and less than 100% by weight, and the content of a monomer unit derived from ethylene is over 0% by weight and 15% by weight or less, provided that the total content of the monomer unit derived from propylene and the monomer unit derived from ethylene is taken as 100% by weight;

(2) a propylene-ethylene-α-olefin copolymer in which the content of a monomer unit derived from propylene is 80% by weight or more and less than 100% by weight, the content of a monomer unit derived from ethylene is over 0% by weight and 10% by weight or less, and the content of a monomer unit derived from an α-olefin having 4 to 12 carbon atoms is over 0% by weight and 10% by weight or less, provided that the total content of the monomer unit derived from propylene, the monomer unit derived from ethylene and the monomer unit derived from an α-olefin having 4 to 12 carbon atoms is taken as 100% by weight; and (3) a propylene-α-olefin copolymer in which the content of a monomer unit derived from propylene is 85% by weight or more and less than 100% by weight, and the content of a monomer unit derived from an α-olefin having 4 to 12 carbon atoms is over 0% by weight and 15% by weight or less, provided that the total content of the monomer unit derived from propylene and the monomer unit derived from an α-olefin having 4 to 12 carbon atoms is taken as 100% by weight.

The ethylene-α-olefin copolymer (II) is an ethylene-α-olefin copolymer comprising a monomer unit derived from ethylene and a monomer unit derived from at least one olefin selected from the group consisting of propylene and α-olefins having 4 to 12 carbon atoms in which the content of the monomer unit derived from ethylene is 20% by weight to 80% by weight, with respect to 100% by weight of the total weight of the ethylene-α-olefin copolymer (II). The content of the monomer unit derived from ethylene is preferably 20% by weight to 75% by weight, more preferably 20% by weight to 60% by weight, further preferably 20% by weight to 40% by weight.

The monomer unit derived from at least one olefin selected from the group consisting of α-olefins having 4 to 12 carbon atoms in the propylene copolymer (I-2) and the ethylene-α-olefin copolymer (II) is derived from an α-olefin having 4 to 12 carbon atoms, and specific examples thereof include 1-butene, 1-pentene, 1-hexene, 1-heptene, 1-octene, 1-nonene, 1-decene, 3-methyl-1-butene, 3-methyl-1-pentene, 4-methyl-1-pentene, 2-ethyl-1-hexene, 2,2,4-trimethyl-1-pentene and the like, and preferable is 1-butene, 1-hexene or 1-octene, and more preferable is 1-butene.

In one example, the propylene copolymer (I-2) can be a random copolymer. Further, in one example, the ethylene-α-olefin copolymer (II) can be a random copolymer.

The propylene copolymer (I-2) includes, for example, a propylene-ethylene copolymer, a propylene-1-butene copolymer, a propylene-1-hexene copolymer, a propylene-1-octene copolymer, a propylene-1-decene copolymer, a propylene-ethylene-1-butene copolymer, a propylene-ethylene-1-hexene copolymer, a propylene-ethylene-1-octene copolymer, a propylene-ethylene-1-decene copolymer and the like, and preferable is a propylene-ethylene copolymer, a propylene-1-butene copolymer or a propylene-ethylene-1-butene copolymer component.

The propylene polymer (I) is preferably a propylene homopolymer, a propylene-ethylene copolymer, a propylene-1-butene copolymer or a propylene-ethylene-1-butene copolymer.

The ethylene-α-olefin copolymer (II) includes, for example, an ethylene-propylene copolymer, an ethylene-propylene-1-butene copolymer, an ethylene-propylene-1-hexene copolymer, an ethylene-propylene-1-octene copolymer, an ethylene-1-butene copolymer, an ethylene-1-hexene copolymer, an ethylene-1-octene copolymer and the like, and preferable is an ethylene-propylene copolymer, an ethylene-1-butene copolymer or an ethylene-1-octene copolymer, and more preferable is an ethylene-propylene copolymer.

In the present specification, the specific example of the heterophasic propylene polymerization material is described as "(propylene polymer (I)-(ethylene-propylene copolymer) heterophasic polymerization material". For example, the description "(propylene)-(ethylene-propylene) heterophasic polymerization material" denotes a heterophasic propylene polymerization material in which the propylene polymer (I) is a propylene homopolymer and the ethylene-α-olefin copolymer (II) is an ethylene-propylene copolymer.

When the propylene polymer (I) of the heterophasic propylene polymerization material is a propylene homopolymer (I-1), the polymerization material includes, for example, a (propylene)-(ethylene-propylene) heterophasic polymerization material, a (propylene)-(ethylene-propylene-1-butene) heterophasic polymerization material, a (propylene)-(ethylene-propylene-1-octene) heterophasic polymerization material, a (propylene)-(ethylene-1-butene) heterophasic polymerization material, a (propylene)-(ethylene-1-octene) heterophasic polymerization material and the like.

When the propylene polymer (I) of the heterophasic propylene polymerization material is a propylene copolymer component (I-2), the polymerization material includes, for example, a (propylene-ethylene)-(ethylene-propylene) heterophasic polymerization material, a (propylene-ethylene)-(ethylene-propylene-1-butene) heterophasic polymerization material, a (propylene-ethylene)-(ethylene-propylene-1-octene) heterophasic polymerization material, a (propylene-ethylene)-(ethylene-1-butene) heterophasic polymerization material, a (propylene-ethylene)-(ethylene-1-octene) heterophasic polymerization material and the like.

The heterophasic propylene polymerization material is preferably a (propylene)-(ethylene-propylene) heterophasic polymerization material, a (propylene)-(ethylene-propylene- 1-butene) heterophasic polymerization material, a (propylene)-(ethylene-1-butene) heterophasic polymerization material, a (propylene)-(ethylene-1-octene) heterophasic polymerization material, a (propylene-ethylene)-(ethylene-propylene) heterophasic polymerization material, a (propylene-ethylene)-(ethylene-propylene-1-butene) heterophasic polymerization material, a (propylene-ethylene)-(ethylene-1-butene) heterophasic polymerization material or a (propylene-ethylene)-(ethylene-1-octene) heterophasic polymerization material, more preferably a (propylene)-(ethylene-propylene) heterophasic polymerization material or a (propylene-ethylene)-(ethylene-propylene) heterophasic polymerization material.

In the present specification, "the xylene-insoluble component" in the heterophasic propylene polymerization material is a component insoluble in p-xylene contained in the heterophasic propylene polymerization material and denotes a solid obtained by the following method.

Two grams of a heterophasic propylene polymerization material is completely dissolved in 2000 mL of boiling p-xylene to obtain a solution, then, the solution is allowed to cool down to 25° C. and left, to precipitate the solid from the solution at 25° C.

In the present specification, "the xylene-soluble component" in the heterophasic propylene polymerization material denotes a component other than the xylene-insoluble component in the heterophasic propylene polymerization material.

The heterophasic propylene polymerization material according to the present invention satisfies all of the requirements (i) to (iv).

The requirement (i) is that the amount of the xylene-soluble component in the heterophasic propylene polymerization material is 40% by weight or more, provided that the total weight of the heterophasic propylene polymerization material is taken as 100% by weight. The amount of the xylene-soluble component is preferably 45% by weight or more from the standpoint of flexibility. The amount of the xylene-soluble component is preferably 80% by weight or less, more preferably 70% by weight or less for compatibility between flexibility and high tensile property.

The content of the xylene-soluble component can be adjusted, for example, by controlling the polymerization temperature, the polymerization pressure and the residence time in producing a propylene polymer (I) and an ethylene-α-olefin copolymer (II).

The requirement (ii) is that the limiting viscosity $[\eta]_{CXIS}$ of the xylene-insoluble component in the heterophasic propylene polymerization material is 1.50 dL/g or more. The limiting viscosity $[\eta]_{CXIS}$ of the xylene-insoluble component is preferably 1.8 dL/g or more, more preferably 2.0 dL/g or more, further preferably 2.1 dL/g or more, particularly preferably 2.2 dL/g or more, from the standpoint of the tensile ultimate strength of the resulting molded body. The limiting viscosity $[\eta]_{CXIS}$ of the xylene-insoluble component is preferably 5 dL/g or less, more preferably 4.5 dL/g or less, further preferably 4.3 dL/g or less, further preferably 4.1 dL/g or less, particularly preferably 4.0 dL/g or less. The limiting viscosity $[\eta]_{CXIS}$ of the xylene-insoluble component is preferably 1.50 dL/g to 5 dL/g, more preferably 1.8 dL/g to 4.5 dL/g, further preferably 2.0 dL/g to 4.3 dL/g, more further preferably 2.1 dL/g to 4.1 dL/g, particularly preferably 2.2 dL/g to 4.0 dL/g.

The limiting viscosity $[\eta]_{CXIS}$ of the xylene-insoluble component can be adjusted, for example, by controlling the hydrogen concentration in producing the propylene polymer (I). The preferable range of the hydrogen concentration is 0.0 to 5.0 mol %, and the more preferable range thereof is 0.0 to 3.0 mol %.

In the present specification, the limiting viscosity is a limiting viscosity measured in tetralin at a temperature of 135° C., and determined by a calculation method described in the reference literature "Polymer Solution, Polymer Experimental Study 11" (published by Kyoritsu Shuppan Co., Ltd., 1982), p. 491, that is, an extrapolation method of plotting the reduced viscosity against the concentration and extrapolating the density to zero. The reduced viscosity is measured at three concentrations of 0.1 g/dL, 0.2 g/dL and 0.5 g/dL by a Ubbelohde type viscometer under conditions of a temperature of 135° C. and a tetralin solvent.

The requirement (iii) is that the ratio ($[\eta]_{CXS}/[\eta]_{CXIS}$) of the limiting viscosity $[\eta]_{CXS}$ of the xylene-soluble component in the heterophasic propylene polymerization material to the limiting viscosity $[\eta]_{CXIS}$ of the xylene-insoluble component therein ($[\eta]_{CXS}/[\eta]_{CXIS}$) is 1.5 or less. The ratio $[\eta]_{CXS}/[\eta]_{CXIS}$ is preferably 1.4 or less, more preferably 1.2 or less, further preferably 1.1 or less.

The ratio $[\eta]_{CXS}/[\eta]_{CXIS}$ can be adjusted, for example, by controlling the hydrogen concentration in producing the ethylene-α-olefin copolymer (II). The preferable range of the hydrogen concentration is 0.2 to 5.0 mol %, and the more preferable range thereof is 0.2 to 3.0 mol %.

The requirement (iv) is that the content of monomer units derived from ethylene and α-olefins having 4 to 12 carbon atoms in the xylene-insoluble component in the heterophasic propylene polymerization material is 6% by weight or more, provided that the total weight of the xylene-insoluble component is taken as 100% by weight. The content of monomer units derived from ethylene and α-olefins having 4 to 12 carbon atoms in the xylene-insoluble component is preferably 7% by weight or more, more preferably 8% by weight or more.

In the present specification, the content of monomer units derived from ethylene and α-olefins having 4 to 12 carbon atoms can be determined by a $^{13}C$ nuclear magnetic resonance method ($^{13}C$-NMR).

The content of monomer units derived from ethylene and α-olefins having 4 to 12 carbon atoms in the xylene-insoluble component can be adjusted, for example, by controlling the ethylene concentration in producing the propylene polymer (I). The preferable range of the ethylene concentration is 1.0 to 10 mol %, and the more preferable range thereof is 1.0 to 5.0 mol %.

The content of the ethylene-α-olefin copolymer (II) contained in the heterophasic propylene polymerization material is preferably 40% by weight to 80% by weight, more preferably 40% by weight to 75% by weight, further preferably 45% by weight to 70% by weight, provided that the total weight of the heterophasic propylene polymerization material is taken as 100% by weight.

The limiting viscosity of the ethylene-α-olefin copolymer (II) measured in tetralin at 135° C. is preferably 0.1 dL/g to 10 dL/g, more preferably 1 dL/g to 5 dL/g, further preferably 1.5 dL/g to 4 dL/g.

The limiting viscosity $[\eta]_{CXS}$ of the xylene-soluble component in the heterophasic propylene polymerization material is preferably 0.1 dL/g to 5.0 dL/g, more preferably 1.0 dL/g to 4.0 dL/g, further preferably 1.5 dL/g to 3.0 dL/g.

The content of monomer units derived from ethylene and α-olefins having 4 to 12 carbon atoms in the xylene-soluble component in the heterophasic propylene polymerization material is preferably 10% by weight to 75% by weight, more preferably 15% by weight to 60% by weight, further preferably 20% by weight to 40% by weight, provided that the total weight of the xylene-soluble component is taken as 100% by weight.

The content of monomer units derived from ethylene in the xylene-soluble component in the heterophasic propylene polymerization material is preferably 10% by weight to 75% by weight, more preferably 15% by weight to 60% by weight, further preferably 20% by weight to 40% by weight, provided that the total weight of the xylene-soluble component is taken as 100% by weight.

The content of monomer units derived from ethylene in the heterophasic propylene polymerization material is preferably 10% by weight to 40% by weight, more preferably 12% by weight to 35% by weight, further preferably 15% by weight to 30% by weight, provided that the total weight of the heterophasic propylene polymerization material is taken as 100% by weight.

The melt flow rate of the heterophasic propylene polymerization material is preferably 0.01 g/10 min to 20 g/10 min, more preferably 0.01 g/10 min to 10 g/10 min, further preferably 0.01 g/10 min to 5 g/10 min. The melt flow rate is measured at 230° C. under a load of 2.16 kg according to a method prescribed in JIS K6758. The melt flow rate of the heterophasic propylene polymerization material is preferably 20 g/10 min or less, from the standpoint of impact resistance.

The limiting viscosity $[\eta]_{whole}$ of the heterophasic propylene polymerization material is preferably 1 dL/g to 10 dL/g, more preferably 1.2 dL/g to 5 dL/g, further preferably 1.5 dL/g to 4 dL/g.

In one example, for the heterophasic propylene polymerization material of the present invention, the absolute value of a difference between the linear expansion coefficient in the TD direction and the linear expansion coefficient in the MD direction which are determined by a method described in an example described later is preferably less than 0.3, more preferably 0.28 or less, further preferably 0.25 or less, particularly preferably 0.22 or less. The smaller this value is, the smaller the anisotropy of the thermal shrinkage ratio is and the better the dimension stability is.

In one example, for the heterophasic propylene polymerization material of the present invention, the tensile elastic modulus determined by a method described in an example described later is preferably 210 MPa or less, more preferably 200 MPa or less, further preferably 180 MPa or less, particularly preferably 170 MPa or less. The smaller this value, the better the flexibility is.

In one example, for the heterophasic propylene polymerization material of the present invention, the ultimate elongation determined by a method described in an example described later is preferably 810% or more, more preferably 830% or more, further preferably 850% or more, particularly preferably 860% or more.

In one example, for the heterophasic propylene polymerization material of the present invention, the ultimate strength determined by a method described in an example described later is preferably 15 MPa or more, more preferably 18 MPa, further preferably 20 MPa or more.

<Production Method of Heterophasic Propylene Polymerization Material>

The propylene polymer component (I) and the ethylene-α-olefin copolymer component (II) can be produced in the same reactor by sequential polymerization, or can be sequentially produced in continuous multistage reactors, alternatively, the propylene polymer component (I) and the ethylene-α-olefin copolymer component (II) produced in separate reactors can be blended. The blend method includes blending in the solution state, blending in the molten state, and the like.

It is preferable that the propylene polymer component (I) and the ethylene-α-olefin copolymer component (II) are sequentially produced in continuous multistage reactors (multistage polymerization). Though the number of multistage reactors is not particularly restricted, it can be, for example, six for polymerization of the propylene polymer component (I) and two for polymerization of the ethylene-α-olefin copolymer component (II). Either of the propylene polymer component (I) and the ethylene-α-olefin copolymer component (II) can be polymerized first. The heterophasic propylene polymerization material obtained by multistage polymerization has a characteristic that physical properties such as tensile property are higher because the propylene polymer component (I) and the ethylene-α-olefin copolymer component (II) are dispersed more homogeneously than the material obtained by blending components produced in separate reactors.

When the heterophasic propylene polymerization material of the present invention is a heterophasic propylene polymerization material comprising a propylene homopolymer (I-1) and an ethylene-α-olefin copolymer (II), the production method of the heterophasic propylene polymerization material includes the following methods.

<Production Method 1>

A production method of a heterophasic propylene polymerization material, comprising the following step (1-1) and the following step (1-2).

Step (1-1): A step of homopolymerizing propylene by a multistage polymerization method in the presence of a propylene polymerization catalyst, to obtain a propylene homopolymer (I-1).

Step (1-2): A step of copolymerizing at least one olefin selected from the group consisting of propylene and α-olefins having 4 to 12 carbon atoms with ethylene by a multistage polymerization method in the presence of the above-described propylene homopolymer (I-1), to obtain a heterophasic propylene polymerization material comprising the propylene homopolymer (I-1) and the ethylene-α-olefin copolymer (II).

<Production Method 2>

A production method of a heterophasic propylene polymerization material, comprising the following step (2-1) and the following step (2-2).

Step (2-1): A step of copolymerizing at least one olefin selected from the group consisting of propylene and α-olefins having 4 to 12 carbon atoms with ethylene by a multistage polymerization method in the presence of a propylene polymerization catalyst, to obtain an ethylene-α-olefin copolymer (II).

Step (2-2): A step of homopolymerizing propylene by a multistage polymerization method in the presence of the above-described ethylene-α-olefin copolymer (II), to obtain a heterophasic propylene polymerization material comprising the propylene homopolymer (I-1) and the ethylene-α-olefin copolymer (II).

When the heterophasic propylene polymerization material of the present invention is a heterophasic propylene polymerization material comprising a propylene copolymer (I-2) and an ethylene-α-olefin copolymer (II), the production method of the heterophasic propylene polymerization material includes the following methods.

<Production Method 3>

A production method of a heterophasic propylene polymerization material, comprising the following step (3-1) and the following step (3-2).

Step (3-1): A step of copolymerizing at least one olefin selected from the group consisting of ethylene and α-olefins having 4 to 12 carbon atoms with propylene by a multistage polymerization method in the presence a propylene polymerization catalyst, to obtain a propylene copolymer (I-2).

Step (3-2): A step of copolymerizing at least one olefin selected from the group consisting of propylene and α-olefins having 4 to 12 carbon atoms with ethylene by a multistage polymerization method in the presence of the above-described propylene copolymer (I-2), to obtain a heterophasic propylene polymerization material comprising the propylene copolymer (1-2) and the ethylene-α-olefin copolymer (II).

<Production Method 4>

A production method of a heterophasic propylene polymerization material, comprising the following step (4-1) and the following step (4-2).

Step (4-1): A step of copolymerizing at least one olefin selected from the group consisting of propylene and α-olefins having 4 to 12 carbon atoms with ethylene by a multistage polymerization method in the presence of a propylene polymerization catalyst, to obtain an ethylene-α-olefin copolymer (II).

Step (4-2): A step of copolymerizing at least one olefin selected from the group consisting of ethylene and α-olefins having 4 to 12 carbon atoms with propylene by a multistage polymerization method in the presence of the above-described ethylene-α-olefin copolymer (II), to obtain a heterophasic propylene polymerization material comprising the propylene copolymer (I-2) and the ethylene-α-olefin copolymer (II).

The multistage polymerization method is a polymerization method of polymerizing a monomer in the presence of a polymerization catalyst in a plurality of reaction areas serially connected, comprising the following steps a to c.

Step a: A step of supplying a polymerization catalyst and a monomer to the first reaction area on the most upstream side, and polymerizing the monomer, to obtain a polymer.

Step b: A step of transferring the polymer obtained in the first reaction area to the second reaction area connected to the first reaction area.

Step c: A step of supplying a monomer to the above-described second reaction area and polymerizing the monomer in the presence of the polymer obtained in the above-described first reaction area, to obtain a polymer.

When the number of the serially connected reaction areas is 3 or more, steps corresponding to the above-described step b and the above-described step c are conducted also in the reaction area after the third reaction area.

The multistage polymerization includes a case of conducting polymerization in a system in which a plurality of reactors having one reaction area on one reactor are serially connected, a case of conducting polymerization in a reactor having a plurality of reaction areas in one reactor, and a case of conducting polymerization in a system in which a reactor having one reaction area in one reactor and a reactor having a plurality of reaction areas in one reactor are connected.

The reactor having a plurality of reaction areas in one reactor includes a multi stage jet flow layer type reactor.

The number of reaction areas in the multistage polymerization method is not particularly restricted. In the above-described step (1-1), the step (2-2), the step (3-1) or the step (4-2), the number of reaction areas of the multistage polymerization method is preferably 6 to 10. In the above-described step (1-2), the above-described step (2-1), the above-described step (3-2) or the above-described step (4-1), the number of reaction areas of the multistage polymerization method is preferably 2 to 5.

It is preferable that the above-described step (1-2), the above-described step (2-1), the above-described step (3-2) or the above-described step (4-1) is conducted under an atmosphere having a hydrogen concentration of over 0.4 mol % and 10 mol % or less. The hydrogen concentration is more preferably 0.5 to 5.0 mol %.

The production method of a heterophasic propylene polymerization material of the present invention can comprise a step of polymerizing a small amount of olefin which is at least one of olefins used in the original polymerization (usually, called main polymerization), where a chain transfer agent such as hydrogen can be used or an external electron donor can also be used for controlling the molecular weight of the olefin polymer to be produced, in the presence of a solid catalyst component and an organic aluminum compound, to generate a catalyst component whose surface is covered with a polymer of the olefin. The polymerization is usually called preliminary polymerization, hence, the catalyst component is usually called a preliminary polymerization catalyst component.

In the production method of a heterophasic propylene polymerization material of the present invention, it is preferable to use a propylene polymerization catalyst described below.

In one embodiment, a propylene polymerization catalyst obtained by contacting a solid catalyst component and an organic aluminum compound, for example, by a known method can be used. In another embodiment, a propylene polymerization catalyst obtained by contacting a solid catalyst component, an organic aluminum compound and an external electron donor can be used.

As the solid catalyst component, solid catalyst components described below are preferably used.

A solid catalyst component for olefin polymerization comprising at least one internal electron donor selected from the group consisting of monoester compounds, aliphatic dicarboxylic acid ester compounds, diol diester compounds, β-alkoxy ester compounds and diether compounds, and a titanium atom, a magnesium atom and a halogen atom, and satisfying the following requirements (I) to (IV).

(I) The whole pore volume measured by a mercury injection method according to the standard ISO15901-1: 2005 is 0.95 to 1.80 mL/g and the specific surface area measured by a mercury injection method according to the standard ISO15901-1: 2005 is 60 to 170 m$^2$/g.

(II) The cumulative percentage of components having a particle size of 10 μm or less in volume-based particle size distribution measured by a laser diffraction scattering method according to the standard ISO13320: 2009 is 6.5% or less.

(III) Among peak components obtained by waveform separation of peaks belonging to the 1s orbital of an oxygen atom obtained by an X-ray photoelectron spectroscopic method according to the standard ISO15472: 2001, the ratio of the area (G) of peak components having the peak top in the range of 529 eV or more and less than 532 eV of the binding energy to the area (F) of peak components having the peak top in the range of 532 eV or more and 534 eV or less of the binding energy (G/F) is 0.33 or less.

(IV) The titanium content is 1.50 to 3.40 wt %.

Such a solid catalyst component can be produced, for example, by a solid catalyst component production method comprising a step (I) of contacting a halogenated titanium compound solution containing a halogenated titanium compound and a solvent with a magnesium compound to obtain a slurry containing a solid product in which the ratio of A represented by the following formula (1) to C represented by the following formula (2) (A/C) is 3 or less in the step (I).

$$A=a/b \quad (1)$$

a: volume (mL) of a halogenated titanium compound contained in a halogenated titanium compound solution
b: volume (mL) of a solvent contained in a halogenated titanium compound solution $$C=a/c \quad (2)$$

a: volume (mL) of a halogenated titanium compound contained in a halogenated titanium compound solution
c: volume (mL) of a solvent contained in a slurry containing a solid product As the monoester compound used as the internal electron donor, aromatic carboxylic acid ester compounds and aliphatic carboxylic acid ester compounds are preferable. The aromatic carboxylic acid ester compound includes methyl benzoate, ethyl benzoate, propyl benzoate, butyl benzoate, pentyl benzoate, hexyl benzoate, octyl benzoate, methyl toluate, ethyl toluate, propyl toluate, butyl toluate, pentyl toluate, hexyl toluate, octyl toluate and the like. The aliphatic carboxylic acid ester compound includes methyl acetate, ethyl acetate, propyl acetate, butyl acetate, pentyl acetate, hexyl acetate, octyl acetate, methyl propionate, ethyl propionate, propyl propionate, butyl propionate, pentyl propionate, hexyl propionate, octyl propionate, methyl butyrate, ethyl butyrate, propyl butyrate, butyl butyrate, pentyl butyrate, hexyl butyrate, octyl butyrate, methyl valerate, ethyl valerate, propyl valerate, butyl valerate, pentyl valerate, hexyl valerate, octyl valerate, methyl caproate, ethyl caproate, propyl caproate, butyl caproate, pentyl caproate, hexyl caproate, octyl caproate, methyl enanthate, ethyl enanthate, propyl enanthate, butyl enanthate, pentyl enanthate, hexyl enanthate, octyl enanthate, methyl caprylate, ethyl caprylate, propyl caprylate, butyl caprylate, pentyl caprylate, hexyl caprylate, octyl caprylate, methyl pelargonate, ethyl pelargonate, propyl pelargonate, butyl pelargonate, pentyl pelargonate, hexyl pelargonate, octyl pelargonate, methyl caprate, ethyl caprate, propyl caprate, butyl caprate, pentyl caprate, hexyl caprate, octyl caprate, methyl laurate, ethyl laurate, propyl laurate, butyl laurate, pentyl laurate, hexyl laurate, octyl laurate, methyl myristate, ethyl myristate, propyl myristate, butyl myristate, pentyl myristate, hexyl myristate, octyl myristate, methyl palmitate, ethyl palmitate, propyl palmitate, butyl palmitate, pentyl palmitate, hexyl palmitate, octyl palmitate, methylmargarate, ethyl margarate, propyl margarate, butyl margarate, pentyl margarate, hexyl margarate, octyl margarate, methyl stearate, ethyl stearate, propyl stearate, butyl stearate, pentyl stearate, hexyl stearate, octyl stearate and the like.

The aliphatic dicarboxylic acid ester compound includes dimethyl ethanedioate, diethyl ethanedioate, dipropyl ethanedioate, dibutyl ethanedioate, dipentyl ethanedioate, dihexyl ethanedioate, dioctyl ethanedioate, dimethyl propanedioate, diethyl propanedioate, dipropyl propanedioate, dibutyl propanedioate, dipentyl propanedioate, dihexyl propanedioate, dioctyl propanedioate, dimethyl butanedioate, diethyl butanedioate, dipropyl butanedioate, dibutyl butanedioate, dipentyl butanedioate, dihexyl butanedioate, dioctyl butanedioate, dimethyl pentanedioate, diethyl pentanedioate, dipropyl pentanedioate, dibutyl pentanedioate, dipentyl pentanedioate, dihexyl pentanedioate, dioctyl pentanedioate, dimethyl hexanedioate, diethyl hexanedioate, dipropyl hexanedioate, dibutyl hexanedioate, dipentyl hexanedioate, dihexyl hexanedioate, dioctyl hexanedioate, dimethyl (E)-but-2-enedioate, diethyl (E)-but-2-enedioate, dipropyl (E)-but-2-enedioate, dibutyl (E)-but-2-enedioate, dipentyl (E)-but-2-enedioate, dihexyl (E)-but-2-enedioate, dioctyl (E)-but-2-enedioate, dimethyl (Z)-but-2-enedioate, diethyl (Z)-but-2-enedioate, dipropyl (Z)-but-2-enedioate, dibutyl (Z)-but-2-enedioate, dipentyl (Z)-but-2-enedioate, dihexyl (Z)-but-2-enedioate, dioctyl (Z)-but-2-enedioate, dimethyl cyclohexane-1,2-dicarboxylate, diethyl cyclohexane-1,2-dicarboxylate, dipropyl cyclohexane-1,2-dicarboxylate, dibutyl cyclohexane-1,2-dicarboxylate, dipentyl cyclohexane-1,2-dicarboxylate, dihexyl cyclohexane-1,2-dicarboxylate, dioctyl cyclohexane-1,2-dicarboxylate, dimethyl 1,2-cyclohexene-1,2-dicarboxylate, diethyl 1,2-cyclohexene-1,2-dicarboxylate, dipropyl 1,2-cyclohexene-1,2-dicarboxylate, dibutyl 1,2-cyclohexene-1,2-dicarboxylate, dipentyl 1,2-cyclohexene-1,2-dicarboxylate, dihexyl 1,2-cyclohexene-1,2-dicarboxylate, dioctyl 1,2-cyclohexene-1,2-dicarboxylate, dimethyl 3-methylcyclohexane-1,2-dicarboxylate, diethyl 3-methylcyclohexane-1,2-dicarboxylate, dipropyl 3-methylcyclohexane-1,2-dicarboxylate, dibutyl 3-methylcyclohexane-1,2-dicarboxylate, dipentyl 3-methylcyclohexane-1,2-dicarboxylate, dihexyl 3-methylcyclohexane-1,2-dicarboxylate, dioctyl 3-methylcyclohexane-1,2-dicarboxylate, dimethyl 3,6-dimethylcyclohexane-1,2-dicarboxylate, diethyl 3,6-dimethylcyclohexane-1,2-dicarboxylate, dipropyl 3,6-dimethylcyclohexane-1,2-dicarboxylate, dibutyl 3,6-dimethylcyclohexane-1,2-dicarboxylate, dipentyl 3,6-dimethylcyclohexane-1,2-dicarboxylate, dihexyl 3,6-dimethylcyclohexane-1,2-dicarboxylate, dioctyl 3,6-dimethylcyclohexane-1,2-dicarboxylate and the like.

The diol diester compound includes 1,2-dibenzoate propane, 1,2-diacetyloxypropane, 1,2-dibenzoate butane, 1,2-diacetyloxybutane, 1,2-dibenzoatecyclohexane, 1,2-diacetyloxycyclohexane, 1,3-dibenzoate propane, 1,3-diacetyloxypropane, 2,4-dibenzoate pentane, 2,4-diacetyloxypentane, 1,2-dibenzoate cyclopentane, 1,2-diacetyloxycyclopentane, 1,2-dibenzoate 4-tert-butyl-6-methylbenzene, 1,2-diacetyloxy-4-tert-butyl-6-methylbenzene, 1,3-dibenzoate 4-tert-butyl-6-methylbenzene, 1,3-diacetyloxy-4-tert-butyl-6-methylbenzene and the like.

The β-alkoxy ester compound includes methyl 2-methoxymethyl-3,3-dimethylbutanoate, ethyl 2-methoxymethyl-3,3-dimethylbutanoate, propyl 2-methoxymethyl-3,3-dimethylbutanoate, butyl 2-methoxymethyl-3,3-dimethylbutanoate, pentyl 2-methoxymethyl-3,3-dimethylbutanoate, hexyl 2-methoxymethyl-3,3-dimethylbutanoate, octyl 2-methoxymethyl-3,3-dimethylbutanoate, methyl 3-methoxy-2-phenylpropionate, ethyl 3-methoxy-2-phenylpropionate, propyl 3-methoxy-2-phenylpropionate, butyl 3-methoxy-2-phenylpropionate, pentyl 3-methoxy-2-phenylpropionate, hexyl 3-methoxy-2-phenylpropionate, octyl 3-methoxy-2-phenylpropionate, methyl 2-ethoxymethyl-3,3-dimethylbutanoate, ethyl 2-ethoxymethyl-3,3-dimethylbutanoate, propyl 2-ethoxymethyl-3,3-dimethylbutanoate, butyl 2-ethoxymethyl-3,3-dimethylbutanoate, pentyl 2-ethoxymethyl-3,3-dimethylbutanoate, hexyl 2-ethoxymethyl-3,3-dimethylbutanoate, octyl 2-ethoxymethyl-3,3-dimethylbutanoate, methyl 3-ethoxy-2-phenylpropionate, ethyl 3-ethoxy-2-phenylpropionate, propyl 3-ethoxy-2-phenylpropionate, butyl 3-ethoxy-2-phenylpropionate, pentyl 3-ethoxy-2-phenylpropionate, hexyl 3-ethoxy-2-phenylpropionate, octyl 3-ethoxy-2-phenylpropionate, methyl 2-propyloxymethyl-3,3-dimethylbutanoate, ethyl 2-propyloxymethyl-3,3-dimethylbutanoate, propyl 2-propyloxymethyl-3,3-dimethylbutanoate, butyl 2-propyloxymethyl-3,3-dimethylbutanoate, pentyl 2-propyloxymethyl-3,3-dimethylbutanoate, hexyl 2-propyloxymethyl-3,3-dimethylbutanoate, octyl 2-propyloxymethyl-3,3-dimethylbutanoate, methyl 3-propyloxy-2-phenylpropionate, ethyl 3-propyloxy-2-phenylpropionate, propyl 3-propyloxy-2-phenylpropionate, butyl 3-propyloxy-2-phenylpropionate, pentyl 3-propyloxy-2-phenylpropionate, hexyl 3-propyloxy-2-phenylpropionate, octyl 3-propyloxy-2-phenylpropionate, methyl 2-methoxybenzenecarboxylate, ethyl 2-methoxybenzenecarboxylate, propyl 2-methoxybenzenecarboxylate, butyl 2-methoxybenzenecarboxylate, pentyl 2-methoxybenzenecarboxylate, hexyl 2-methoxybenzenecarboxylate, octyl 2-methoxybenzenecarboxylate, methyl 2-ethoxybenzenecarboxylate, ethyl 2-ethoxybenzenecarboxylate, propyl 2-ethoxybenzenecarboxylate, butyl 2-ethoxybenzenecarboxylate, pentyl 2-ethoxybenzenecarboxylate, hexyl 2-ethoxybenzenecarboxylate, octyl 2-ethoxybenzenecarboxylate and the like.

The diether compound includes 1,2-dimethoxypropane, 1,2-diethoxypropane, 1,2-dipropyloxypropane, 1,2-dibutoxypropane, 1,2-di-tert-butoxypropane, 1,2-diphenoxypropane, 1,2-dibenzyloxypropane, 1,2-dimethoxybutane, 1,2-diethoxybutane, 1,2-dipropyloxybutane, 1,2-dibutoxybutane, 1,2-di-tert-butoxybutane, 1,2-diphenoxybutane, 1,2-dibenzyloxybutane, 1,2-dimethoxycyclohexane-1,2-diethoxycyclohexane-1,2-dipropyloxycyclohexane-1,2-dibutoxycyclohexane-1,2-di-tert-butoxy cyclohexane-1,2-diphenoxycyclohexane-1,2-dibenzyloxycyclohexane, 1,3-dimethoxypropane, 1,3-diethoxypropane, 1,3-dipropyloxypropane, 1,3-dibutoxypropane, 1,3-di-tert-butoxypropane, 1,3-diphenoxypropane, 1,3-dibenzyloxypropane, 2,4-dimethoxypentane, 2,4-diethoxypentane, 2,4-dipropyloxypentane, 2,4-dibutoxypentane, 2,4-di-tert-butoxypentane, 2,4-diphenoxypentane, 2,4-dibenzyloxypentane, 1,2-dimethoxycyclopentane, 1,2-diethoxycyclopentane, 1,2-dipropyloxycyclopentane, 1,2-dibutoxycyclopentane, 1,2-di-tert-butoxycyclopentane, 1,2-diphenoxycyclopentane, 1,2-dibenzyloxycyclopentane, 9,9-bis(methoxymethyl)fluorene, 9,9-bis(ethoxymethyl)fluorene, 9,9-bis(propyloxymethyl)fluorene, 9,9-bis(butoxymethyl)fluorene, 9,9-bis-tert-butoxymethylfluorene, 9,9-bis(phenoxymethyl)fluorene, 9,9-bis(benzyloxymethyl)fluorene, 1,2-dimethoxybenzene, 1,2-diethoxybenzene, 1,2-dipropyloxybenzene, 1,2-dibutoxybenzene, 1,2-di-tert-butoxybenzene, 1,2-diphenoxybenzene and 1,2-dibenzyloxybenzene and the like.

Alternatively, internal electron donors described in Japanese Unexamined Patent Application Publication (JP-A) No. 2011-246699 can also be applied.

The internal electron donor includes preferably a dicarboxylic acid ester compound, a diol diester compound and a β-alkoxy ester compound. The internal electron donors can be used each singly or in combination of two or more kinds thereof.

As the organic aluminum compound, for example, compounds described in JP-A No. Hei-10-212319 can be exemplified. Of them, preferable are trialkylaluminums, mixtures of trialkylaluminums with dialkylaluminum halides, or alkylalumoxanes, further preferable is triethylaluminum, triisobutylaluminum, a mixture of triethylaluminum with diethylaluminum chloride, or tetraethyldialumoxane.

As the external electron donor, compounds described in Japanese Patent No. 2950168, JP-A No. 2006-96936, JP-A No. 2009-173870 and JP-A No. 2010-168545 can be exemplified. Of them, oxygen-containing compounds or nitrogen-containing compounds are preferable. As the oxygen-containing compound, alkoxysilicons, ethers, esters and ketones can be exemplified.

Of them, alkoxysilicons or ethers are preferable, and the external electron donor includes cyclohexylmethyldimethoxysilane, cyclohexylethyldimethoxysilane, diisopropyldimethoxysilane, tert-butylethyldimethoxysilane, tert-butyl-n-propyldimethoxysilane, phenyltrimethoxysilane, diphenyldimethoxysilane, dicyclobutyldimethoxysilane, dicyclopentyldimethoxysilane, tetraethoxysilane, methyltriethoxysilane, ethyltriethoxysilane, iso-butyltriethoxysilane, vinyltriethoxysilane, sec-butyltriethoxysilane, cyclohexyltriethoxysilane and cyclopentyltriethoxysilane.

As the solvent, inactive hydrocarbons such as propane, butane, isobutane, pentane, isopentane, hexane, heptane, octane, cyclohexane, benzene and toluene are preferable.

The above-described heterophasic propylene polymerization material production method can comprise a step of polymerizing a small amount of olefin in the presence of a solid catalyst component and an organic aluminum compound to generate a catalyst component whose surface is covered with a polymer of the olefin. The polymerization is usually called preliminary polymerization, hence, the catalyst component is usually called a preliminary polymerization catalyst component. The olefin used in preliminary polymerization is at least one of olefins which constitutes the heterophasic propylene polymerization material. In the preliminary polymerization step, a chain transfer agent such as hydrogen can be used, or an external electron donor can be used, for controlling the molecular weight of the olefin polymer to be generated.

In one embodiment of preliminary polymerization, the amount of an organic aluminum compound is preferably 0.1 to 700 mol, more preferably 0.2 to 200 mol, with respect to 1 mol of a transition metal atom contained in a solid catalyst component. The amount of an external electron donor is preferably 0.01 to 400 mol, with respect to 1 mol of a transition metal atom contained in a solid catalyst component. The amount of a solid catalyst component contained per 1 L of a solvent is preferably 1 to 500 g. The amount of an olefin to be preliminarily polymerized is usually 0.1 to 200 g per 1 g of a solid catalyst component.

In one embodiment, a propylene polymer (I) can be produced by multistage polymerization, then, an ethylene-α-olefin copolymer (II) can be produced by multistage polymerization.

At the first stage, for example, a vessel type reactor can be used. The polymerization temperature can be, for example, 0 to 120° C. The polymerization pressure can be, for example, normal pressure to 10 MPaG.

At the second stage, for example, a gas phase reactor can be used. The polymerization temperature is, for example, preferably 40 to 80° C., more preferably 40 to 75° C. The polymerization pressure is, for example, preferably normal pressure to 10 MPaG, more preferably normal pressure to 2.0 MPaG.

At the third stage, for example, a gas phase reactor can be used. The polymerization temperature is, for example, preferably 0 to 120° C. The polymerization pressure is, for example, preferably normal pressure to 10 MPaG, more preferably normal pressure to 2.0 MPaG. The hydrogen concentration is, for example, preferably 0.4 to 10 vol %.

At the fourth stage, for example, a gas phase reactor can be used. The polymerization temperature is, for example, preferably 0 to 120° C. The polymerization pressure is, for example, preferably normal pressure to 10 MPaG, more preferably normal pressure to 2.0 MPaG. The hydrogen concentration is, for example, preferably 0.4 to 10 vol %.

<Application of Heterophasic Propylene Polymerization Material>

The heterophasic propylene polymerization material of the present invention can be blended with an olefinic polymer other than the propylene polymer (I) and the ethylene-α-olefin copolymer (II), if necessary. The olefinic polymer includes, for example, ethylene-based polymers. In the present specification, the ethylene-based polymer denotes a polymer in which the content of a monomer unit derived from ethylene is over 50% by weight. The ethylene-based polymer includes, for example, an ethylene homopolymer, a copolymer of ethylene with propylene, a copolymer of ethylene with an α-olefin having 4 to 12 carbon atoms, an ethylene-vinyl acetate copolymer, an ethylene-ethyl acrylate copolymer, an ethylene-methacrylic acid copolymer and the like. The ethylene homopolymer includes low density polyethylene, medium density polyethylene and high density polyethylene. The copolymer of ethylene with an α-olefin having 4 to 20 carbon atoms includes, for example, an ethylene-1-butene copolymer, an ethylene-1-pentene copolymer, an ethylene-1-hexene copolymer, an ethylene-1-octene copolymer and the like.

The olefinic polymer to be blended into a heterophasic propylene polymerization material can be used singly or in combination of two or more kinds thereof. The amount of the olefinic polymer to be blended is preferably 0.1 to 40% by weight, more preferably 1 to 30% by weight based on the total heterophasic propylene polymerization material.

If necessary, additives such as a heat-resistant stabilizer, a UV stabilizer, an antioxidant, a crystal nucleating agent, a lubricant, an anti-blocking agent, an antistatic agent, an anti-fogging agent, a flame retardant, a petroleum resin, a foaming agent, a foaming aid and an organic or inorganic filler can be added to the heterophasic propylene polymerization material of the present invention. The addition amount of the additive is preferably 0.01% by weight or more and preferably 30% by weight or less based on the total heterophasic propylene polymerization material. The additive can be used singly or in combination of two or more kinds thereof at any ratio.

The heterophasic propylene polymerization material of the present invention can be suitably used in molding methods such as, for example, an extrusion molding method, an injection molding method, a compression molding method, a foaming molding method, a hollow molding method, a blow molding method, a vacuum molding method, a powder molding method, a calender molding method, an inflation molding method and a press molding method.

The application of the heterophasic propylene polymerization material of the present invention includes, for example, automobile parts such as automobile interior parts and exterior parts, food and medical containers, furniture and electric appliance parts, civil engineering and construction materials and the like. The automobile interior parts include, for example, an instrumental panel, a trim, a door panel, a side protector, a console box, a column cover and the like. The automobile exterior parts include, for example, a bumper, a fender, a wheel cover and the like. The food and medical containers include, for example, a wrapping film, a food container, an infusion bag, an infusion bottle and the like.

The furniture and electric appliance parts include, for example, a wallpaper, a flooring material, a decorative sheet, a drainage hose of a washing machine and the like. The civil engineering and construction materials include, for example, a waterproof sheet, a water-impermeable sheet, a hose, a duct, a gasket and the like. The water-impermeable sheet is a sheet laid in the final disposal site or the like so that water held in wastes, rainwater and the like will not leach out.

Embodiments of the present invention will be illustrated further in detail by examples shown below. Of course, the present invention is not limited to the following examples, and it goes without saying that various embodiments can be made with respect to details. Further, the present invention is not limited to the embodiments described above, and various modifications are possible within the scope indicated in the claims, and also embodiments obtained by appropriately combining the disclosed technical means respectively are included in the technical range of the present invention.

Further, all of the documents described in the present specification are incorporated by reference.

EXAMPLES

The measurement values of each item in the detailed description of the invention and examples and comparative examples are those measured by the following methods.

(1) Limiting Viscosity ($[\eta]$, Unit: dL/g)

Limiting viscosity ($[\eta]_{whole}$) of whole heterophasic propylene polymerization material, limiting viscosity ($[\eta]_{CXIS}$) of xylene-insoluble component in heterophasic propylene polymerization material, and limiting viscosity ($[\eta]_{CXS}$) of xylene-soluble component in heterophasic propylene polymerization material Using a Ubbelohde type viscometer, the reduced viscosity was measured at three concentrations of 0.1 g/dL, 0.2 g/dL and 0.5 g/dL. The limiting viscosity was determined by a calculation method described in the reference literature "Polymer Solution, Polymer Experimental Study 11" (published by Kyoritsu Shuppan Co., Ltd., 1982), p. 491, that is, an extrapolation method of plotting the reduced viscosity against the concentration and extrapolating the density to zero. It was measured using tetralin as the solvent at a temperature of 135° C.

(2) Content of Monomer Unit Derived from Ethylene (Unit: % by Weight)

The content of a monomer unit derived from ethylene in the heterophasic propylene polymerization material with respect to 100% by weight of the total weight of the heterophasic propylene polymerization material (hereinafter, described as "T-C2'"), the content of a monomer unit derived from ethylene in the xylene-insoluble component in the heterophasic propylene polymerization material with respect to 100% by weight of the total weight of the xylene-soluble component (hereinafter, described as "C2'/CXIS"), and the content of a monomer unit derived from ethylene in the xylene-soluble component in the heterophasic propylene polymerization material with respect to 100% by weight of the total weight of the xylene-soluble component (C2'/CXS) were determined based on the report of Kakugo, et al. (reference literature: Macromolecules 1982, 15, 1150-1152) from the $^{13}$C-NMR spectra measured under the following conditions.

<Carbon Nuclear Magnetic Resonance ($^{13}$C-NMR) Measurement Conditions>

Apparatus: AVANCEIII 600HD manufactured by Bruker BioSpin Corp.

Measuring probe: 10 mm cryoprobe

Measuring solvent: mixed liquid of 1,2-dichlorobenzene/1,1,2,2-tetrachloroethane-d$_2$=85/15 (volume ratio)

Sample concentration: 100 mg/mL

Measuring temperature: 135° C.

Measuring method: proton decoupling method

Cumulative number: 256 times

Pulse width: 450

Pulse repetition time: 4 seconds

Measurement standard: tetramethylsilane (3) Xylene-Insoluble Component (CXIS, Unit: % by Weight)

Two grams (2 g) of a heterophasic propylene polymerization material was completely dissolved in 2000 mL of boiling xylene to obtain a solution, then, the solution was allowed to cool down to 25° C. and left. Thereafter, a solid precipitated in the solution at 25° C. was separated by filtration, and dried under reduced pressure at 80° C., to obtain a xylene-insoluble component.

(4) Xylene-Soluble Component (CXS, Unit: % by Weight)

Two grams (2 g) of a heterophasic propylene polymerization material was completely dissolved in 2000 mL of boiling xylene to obtain a solution, then, the solution was allowed to cool down to 25° C. and left. Thereafter, a solid precipitated in the solution at 25° C. was separated by filtration, the filtrate was concentrated and dried to evaporate xylene, and further, dried under reduced pressure at 80° C., to obtain a xylene-soluble component.

(5) Melt Flow Rate (MFR, Unit: g/10 Min)

The melt flow rate was measured according to a method prescribed in JIS K6758. It was measured at a measuring temperature of 230° C. under a load of 2.16 kg.

(6) Measurement of Linear Expansion Coefficient and Fabrication of Sheet for Tensile Test A sheet used in measurement of linear expansion coefficient and a tensile test described later was fabricated according to the following method. Pellets of a heterophasic propylene polymerization material were melt-extruded by an extruder having a screw diameter of 25 mm (manufactured by Union Plastic Corp., Ltd) at a resin temperature of 220° C., and the melt-extruded sheet was cooled by a cooling roll, to fabricate a sheet having a thickness of 1.0 mm.

(7) Linear Expansion Coefficient (Unit: K$^{-1}$)

The linear expansion coefficient was measured as described below using a thermomechanical analyzer TMA/SS6100 manufactured by Hitachi High-Tech Science Corporation. A sheet of 100 mm in TD direction×400 mm in MD direction×1.0 mm thick was cut out from the sheet fabricated in the above-described (6). The sheet was annealed at 140° C. for 35 minutes, then, a test piece of 10 mm in MD direction×5 mm in TD direction was cut out from the center part, and the dimension at room temperature was measured correctly. The test piece was set to the thermomechanical analyzer so that a change in dimension in the MD direction (resin flow direction) or the TD direction (resin width direction) in extrusion molding can be measured. The temperature was raised from −40 to 40° C. at a temperature elevating rate of 5° C./min, and a change in dimension in the MD direction and the TD direction during the temperature elevation was measured. The dimension change per unit length and unit temperature was determined as the linear expansion coefficient. The absolute value of a difference between the linear expansion coefficient in the TD direction and the linear expansion coefficient in the MD direction is determined, and the smaller the absolute value of a difference between the linear expansion coefficient in the TD direction and the linear expansion coefficient in the MD direction is, the smaller the anisotropy of thermal shrinkage ratio is and the better the dimension stability is.

(8) Tensile Test (Tensile Elastic Modulus, Unit: MPa)

A tensile test of a test piece of 20 mm width×120 mm length×1.0 mm thickness cut out from the sheet fabricated in the above-described (6) was conducted under conditions of a distance between grips of 60 mm and a tensile rate of 5 mm/min, and the tensile elastic modulus was evaluated. The smaller the tensile elastic modulus is, the better the flexibility is.

(9) Tensile Test (Ultimate Strength (US), Unit: MPa)

A tensile test of a test piece cut out from the sheet fabricated in the above-described (6) was conducted at a tensile rate of 50 mm/min according to a method prescribed in JIS K6251, and the ultimate strength (US) was evaluated.

(10) Tensile Test (Ultimate Elongation (UE), Unit: %)

A tensile test of a test piece cut out from the sheet fabricated in the above-described (6) was conducted at a tensile rate of 50 mm/min according to a method prescribed in JIS K6251, and the ultimate elongation (UE) was evaluated.

Reference Example: Production of Solid Catalyst Component

Step (1-1A): An atmosphere in a 100 mL flask equipped with a stirring machine, a dropping funnel and a thermometer was purged with nitrogen, then, 36.0 mL of toluene and 22.5 mL of titanium tetrachloride were charged in the flask, and stirred, to obtain a titanium tetrachloride solution. The temperature in the flask was adjusted to 0° C., then, 1.88 g of magnesium diethoxide was added at the same temperature four times every 30 minutes, then, stirred at 0° C. for 1.5 hours. Then, 0.60 mL of ethyl 2-ethoxymethyl-3,3-dimethylbutanoate was added into the flask, then, the temperature in the flask was raised to 10° C. Thereafter, the mixture was stirred at the same temperature for 2 hours, and 9.8 mL of toluene was added. Then, the temperature in the flask was elevated, and at 60° C., 3.15 mL of ethyl 2-ethoxymethyl-3,3-dimethylbutanoate was added into the flask, and the mixture was heated up to 110° C. The mixture in the flask was stirred at the same temperature for 3 hours.

The resultant mixture was subjected to solid-liquid separation, to obtain a solid. The solid was washed with 56.3 mL of toluene three times at 100° C.

Step (1-1B): To the solid after washing was added 38.3 mL of toluene, to form a slurry. To the slurry, 15.0 mL of titanium tetrachloride and 0.75 mL of ethyl 2-ethoxymethyl-3,3-dimethylbutanoate were added to form a mixture, and the mixture was stirred at 110° C. for 1 hour. Thereafter, the stirred mixture was subjected to solid-liquid separation, and the solid was washed with 56.3 mL of toluene three times at 60° C., and further, washed with 56.3 mL of hexane three times at room temperature, and the solid after washing was dried under reduced pressure, to obtain a solid catalyst component.

For this solid catalyst component, the titanium atom content was 2.53% by weight, the ethoxy group content was 0.44% by weight and the internal electron donor content was 13.7% by weight. Further, the center particle size according to a laser diffraction•scattering method was 59.5 μm, and the cumulative percentage of components having a size of 10

μm or less in volume-based particle size distribution was 5.3%. The amount of peak components derived from the 1s orbital of an oxygen atom by XPS analysis and having peak positions in the rage of 532 to 534 eV of the binding energy was 85.0% and the amount of the above-described components having peak positions in the rage of 529 to 532 eV of the binding energy was 15.0%. The whole pore volume by a mercury injection method was 1.43 mL/g, the total volume of pores having a pore radius in the range of 5 to 30 nm was 0.160 mL/g, the total volume of pores having a pore radius in the range of 30 to 700 nm was 0.317 mL/g, and the specific surface area was 107.44 m$^2$/g.

Example 1: Production of Heterophasic Propylene Polymerization Material (1-1a) Preliminary Polymerization An SUS autoclave equipped with a stirring machine having an internal volume of 3 L was charged with 1.0 L of sufficiently dehydrated and deaerated n-hexane, 20 mmol of triethylaluminum (hereinafter, described as "TEA" in some cases) and 2.0 mmol of t-butyl-n-propyldimethoxysilane. Into this was added 7 g of the solid catalyst component produced in Reference Example, and 7 g of propylene was continuously supplied over a period of about 30 minutes while keeping the temperature in the autoclave at about 10° C. and preliminary polymerization was performed. Thereafter, the preliminarily polymerized slurry was transferred an SUS316L autoclave equipped with a stirring machine having an internal volume of 150 L, and 100 L of liquid butane was added, to give a slurry of a preliminary polymerization catalyst component.

(1-1b) Main Polymerization

By an apparatus in which a slurry polymerization reactor and three gas phase reactors are serially disposed, a propylene copolymer component (I-2) was produced in the following polymerization step I and the following polymerization step II, and transferred to the latter stage without deactivating the produced polymer, and an ethylene-α-olefin copolymer (II) was produced in the following polymerization step III-1 and the following polymerization step III-2.

[Polymerization Step I (Propylene-Ethylene Copolymerization Using Olefin Preliminary Polymerization Reaction Apparatus)]

Using an SUS304 vessel type slurry polymerization reactor equipped with a stirring machine, copolymerization of propylene and ethylene was carried out. That is, a slurry of propylene, ethylene, hydrogen, triethylaluminum, t-butyl-n-propyldimethoxysilane and the preliminary polymerization catalyst component produced in (1-1a) was continuously supplied to the reactor and the polymerization reaction was conducted. The reaction conditions were as described below.

Polymerization temperature: 55° C.
Stirring rate: 150 rpm
Liquid level of reactor: 18 L
Supply amount of propylene: 44 kg/hr
Supply amount of ethylene: 0.15 kg/hr
Supply amount of hydrogen: 11.0 NL/hr
Supply amount of triethylaluminum: 14.2 mmol/hr
Supply amount of t-butyl-n-propyldimethoxysilane: 2.34 mmol/hr
Supply amount of slurry of preliminary polymerization catalyst component (in terms of polymerization catalyst component): 0.38 g/hr
Polymerization pressure: 2.49 MPa (gauge pressure)

[Polymerization Step II (Propylene-Ethylene Copolymerization (Gas Phase Polymerization) by Multi Stage Gas Phase Polymerization Reaction Apparatus)]

A multi stage gas phase polymerization reactor having 6 reaction area stages in the vertical direction in which the top stage is a fluidized bed and the remaining 5 stages are jet flow layers was prepared as a multi stage gas phase polymerization reaction apparatus.

A slurry containing polypropylene particles and liquid propylene was continuously supplied from the slurry polymerization reactor of the former stage to the fluidized bed as the top stage of the above-described multi stage gas phase polymerization reactor without deactivation.

The inter-stage transfer of polypropylene particles in the multi stage gas phase polymerization reactor was conducted in a double valve fashion. In this transfer means, the reaction area of the upper stage and the reaction area of the lower stage are connected by piping of 1 inch size, tow on-off valves are provided in the piping, and the upper valve is opened with the lower valve closed, the powder is accumulated between valves from the reaction area of the upper stage, then, the lower valve is opened after closing the upper valve, thereby transferring polypropylene particles to the reaction area of the lower stage.

Propylene, ethylene and hydrogen were continuously supplied from the lower part of the multi stage gas phase polymerization reactor having the above-described constitution. By this, a fluidized bed or a jet flow layer was formed in each reaction area, the supply amount of propylene, ethylene and hydrogen was controlled so as to keep the gas composition and the pressure constant, and copolymerization of propylene and ethylene was further conducted while purging the excess gas.

Polymerization temperature: 60° C.
Polymerization pressure: 1.80 MPa (gauge pressure)

In the reactor, the concentration ratio of gases in the reactor was 1.67 mol %=ethylene/(propylene+ethylene), and 1.0 mol %=(hydrogen/(hydrogen+propylene)). The concentration ratio of gases in the reactor is determined by the hydrogen concentration, the ethylene concentration and the propylene concentration in Table 1.

[Polymerization Step III-1 (Propylene-Ethylene Copolymerization (Gas Phase Polymerization) by Fluidized Bed Type Reactor)]

Polypropylene particles discharged from the multi stage gas phase polymerization reactor of the former stage were continuously supplied to the fluidized bed type reactor. The fluidized bed type reactor has a gas dispersion plate, and transfer of polypropylene particles from the multi stage gas phase polymerization reactor of the former stage to the fluidized bed type reactor was conducted in the above-described double valve fashion.

Propylene, ethylene and hydrogen were continuously supplied to the fluidized bed type reactor having the above-described constitution, the gas supply amount was controlled so as to keep the gas composition and the pressure constant, and copolymerization of propylene and ethylene was conducted in the presence of polypropylene particles while purging the excess gas. The reaction conditions were as described below.

Polymerization temperature: 70° C.,
Polymerization pressure: 1.77 MPa (gauge pressure)

The concentration ratio of gases in the reactor was 20.3 mol %=ethylene/(propylene+ethylene), and 1.2 mol %=hydrogen/(hydrogen+propylene+ethylene).

[Polymerization Step III-2 (Propylene-Ethylene Copolymerization (Gas Phase Polymerization) by Fluidized Bed Type Reactor)]

Polypropylene particles discharged from the fluidized bed type reactor of the polymerization step III-1 was further continuously supplied to the fluidized bed type reactor of the latter stage. The fluidized bed type reactor of the polymerization step III-2 has a gas dispersion plate like the fluidized bed type reactor of the polymerization step III-1, and transfer of polypropylene particles from the fluidized bed type reactor of the polymerization step III-1 to the fluidized bed type reactor of the polymerization step III-2 was conducted in the double valve fashion.

Copolymerization of propylene and ethylene was conducted to obtain a heterophasic propylene polymerization material in the same manner as in the above-described polymerization step III-1, excepting the following conditions.

Polymerization temperature: 70° C.
Polymerization pressure: 1.74 MPa (gauge pressure)
In this reactor, the concentration ratio of gases in the reactor was 19.8 mol %=ethylene/(propylene+ethylene), and 1.3 mol %=hydrogen/(hydrogen+propylene+ethylene).

The proportion (X) of an ethylene-α-olefin copolymer (II) in the resultant heterophasic propylene polymerization material was determined by measuring the crystal melting heat quantities of the propylene polymer (I) and the total heterophasic propylene polymerization material, respectively, and calculating using the following equation. The crystal melting heat quantity was measured by differential scanning calorimetry (DSC).

$$X = 1 - (\Delta Hf)T/(\Delta Hf)P$$

(ΔHf)T: melting heat quantity (J/g) of total heterophasic propylene polymerization material
(ΔHf)P: melting heat quantity (J/g) of propylene polymer (I)

Example 2, Comparative Example 1, Comparative Example 2: Production of Heterophasic Propylene Polymerization Material The materials of Example 2 and Comparative Example 1 and Comparative Example 2 were produced in the same manner as in Example 1, excepting values shown in Table 1.

TABLE 1

| | | | Example 1 | Example 2 | Comparative Example 1 | Comparative Example 2 |
|---|---|---|---|---|---|---|
| preliminary polymerization | TEA concentration | mmol/L | 20 | 20 | 20 | 20 |
| | electron donor component/TEA | mmol/mmol | 0.1 | 0.1 | 0.1 | 0.1 |
| | solid catalyst component concentration | g/L | 7.8 | 7.0 | 5.8 | 5.8 |
| | temperature | ° C. | 15 or less | 15 or less | 15 or less | 15 or less |
| | propylene/solid catalyst component | g/g | 1.0 | 1.0 | 1.0 | 1.0 |
| propylene polymer (I) | | | | | | |
| main polymerization, polymerization step I | polymerization temperature | ° C. | 55 | 50 | 55 | 55 |
| | polymerization pressure | MPaG | 2.49 | 3.03 | 2.52 | 2.54 |
| | propylene supply amount | kg/hr | 44 | 30 | 40 | 42 |
| | hydrogen supply amount | NL/hr | 11.0 | 5.4 | 10.0 | 10.5 |
| | ethylene supply amount | kg/hr | 0.15 | 0.05 | 0.14 | 0.15 |
| | TEA supply amount | mmol/hr | 14.2 | 17.9 | 14.3 | 12.7 |
| | electron donor component supply amount | mmol/hr | 2.34 | 3.58 | 2.74 | 2.62 |
| | solid catalyst component supply amount | g/hr | 0.38 | 0.35 | 0.30 | 0.25 |
| main polymerization, polymerization step II | polymerization temperature | ° C. | 60 | 57 | 80 | 70 |
| | polymerization pressure | MPaG | 1.80 | 1.70 | 2.00 | 2.00 |
| | hydrogen concentration | vol % | 0.84 | 0.80 | 0.83 | 0.83 |
| | ethylene concentration | vol % | 1.40 | 3.04 | 1.41 | 1.38 |
| | propylene concentration | vol % | 82.63 | 69.66 | 81.10 | 81.01 |
| | crystal melting heat quantity | J/g | 70 | 55 | 70 | 70 |
| ethylene-α-olefin copolymer (II) | | | | | | |
| main polymerization, polymerization step III-1 | polymerization temperature | ° C. | 70 | 70 | 70 | 70 |
| | polymerization pressure | MPaG | 1.77 | 1.67 | 1.97 | 1.97 |
| | hydrogen concentration | vol % | 1.24 | 1.39 | 0.12 | 1.33 |
| | ethylene concentration | vol % | 19.89 | 20.41 | 27.71 | 19.02 |
| | propylene concentration | vol % | 78.26 | 81.04 | 71.22 | 78.73 |
| main polymerization, polymerization step III-2 | polymerization temperature | ° C. | 70 | 70 | 70 | 70 |
| | polymerization pressure MPaG | 1.74 | 1.64 | 1.94 | 1.94 |
| | hydrogen concentration | vol % | 1.26 | 1.46 | 0.19 | 1.36 |
| | ethylene concentration | vol % | 19.68 | 21.68 | 27.63 | 19.31 |
| | propylene concentration | vol % | 79.49 | 81.29 | 72.48 | 79.72 |
| heterophasic propylene polymerization material | | | | | | |
| | [η] whole | dL/g | 2.44 | 2.70 | 5.28 | 2.59 |
| | crystal melting heat quantity | J/g | 28 | 19 | 33 | 39 |
| | proportion of ethylene-α-olefin copolymer (II) | wt % | 60 | 66 | 53 | 44 |

The resultant powdery heterophasic propylene polymerization material was kneading-extruded at an extrusion output of 50 kg/hr, a temperature of 230° C. and a screw rotation speed of 350 rpm using a twin-screw kneading extruder (type TEX44SS-30BW-2V manufactured by The Japan Steel Works, LTD.), to pelletize the material.

Example 3: Production of Heterophasic Propylene Polymerization Material

A stainless autoclave equipped with a stirring machine having an internal volume of 3 liters was dried under reduced pressure, then, purged with argon, then, cooled. The solid catalyst component (3.0 mg) produced in Reference Example and triethylaluminum (2.6 mmol) and t-butyl-n-propyldimethoxysilane (0.26 mmol) were contacted in a heptane solution in a glass charger, then, collectively introduced into the above-described autoclave. Further, hydrogen (0.09 MPa), propylene (780 g) and ethylene (3 g) were introduced into the above-described autoclave, then, heated up to 70° C. to start polymerization, and ethylene was continuously supplied at constant pressure (0.15 MPa). After 10 minutes from initiation of polymerization, ethylene supply was stopped, and unreacted monomers were purged out of the autoclave and the temperature in the autoclave was lowered to 55° C., to obtain a propylene copolymer (I-2). Next, a mixed gas of ethylene (3.2 NL/min), propylene (6.0 NL/min) and hydrogen (0.01 NL/min) was continuously supplied to the autoclave so that the total pressure was 6.0 Kg/m$^2$ G, and polymerized for 240 minutes. After 240 minutes, the gas in the autoclave was purged and polymerization was terminated, and the generated polymerization material was dried under reduced pressure at 70° C. for 3 hours, to obtain 353 g of a powder of a heterophasic propylene polymerization material. The limiting viscosity $[\eta]_{whole}$ of the resultant heterophasic propylene polymerization material was 3.41 dL/g.

Example 4: Production of Heterophasic Propylene Polymerization Material

The material of Example 4 was produced in the same manner as in Example 3 except that the flow rate of hydrogen in the latter stage polymerization was changed to 0.04 NL/min.

Comparative Example 3: Production of Heterophasic Propylene Polymerization Material The material of Comparative Example 3 was produced in the same manner as in Example 4 except that the hydrogen pressure in the former stage polymerization was changed to 0.45 MPa and the ethylene pressure thereof was changed to 0.05 MPa.

The resultant powdery heterophasic propylene polymerization material was kneading-extruded at an extrusion output of 2 kg/hr, a temperature of 220° C. and a screw rotation speed of 300 rpm using a twin-screw kneading extruder (type KZW15-45MG manufactured by TECH-NOVEL Corp.), to pelletize the material.

The analysis results and the evaluation results of the resultant sample are shown in Table 2.

TABLE 2

| | | examples | | | | | | |
|---|---|---|---|---|---|---|---|---|
| | | Example 1 | Example 2 | Example 3 | Example 4 | Comparative Example 1 | Comparative Example 2 | Comparative Example 3 |
| $[\eta]$ whole | dL/g | 2.44 | 2.70 | 3.41 | 2.58 | 5.28 | 2.59 | 2.28 |
| MFR | g/10 min | 1.0 | 0.7 | 0.2 | 0.6 | 0.4 | 1.3 | 1.3 |
| T-C2' | wt % | 21.0 | 21.3 | 22.6 | 22.2 | 23.2 | 16.7 | 20.6 |
| CXIS | wt % | 51.8 | 51.8 | 45.7 | 37.9 | 59.0 | 63.0 | 41.2 |
| CXS | wt % | 48.2 | 48.2 | 54.3 | 62.1 | 41.0 | 37.0 | 58.8 |
| C2'/CXIS | wt % | 14.4 | 15.9 | 16.82 | 14.43 | 17.1 | 9.4 | 11.8 |
| C2'/CXS | wt % | 30.8 | 25.5 | 27.5 | 27.4 | 35.1 | 30.4 | 26.9 |
| $[\eta]$ CXIS | dL/g | 2.14 | 2.80 | 3.20 | 2.52 | 2.12 | 2.20 | 1.47 |
| $[\eta]$ CXS | dL/g | 2.03 | 2.65 | 3.37 | 2.53 | 4.53 | 2.55 | 2.18 |
| $[\eta]$ CXS/$[\eta]$ CXIS | — | 0.95 | 0.95 | 1.05 | 1.00 | 2.14 | 1.16 | 1.48 |
| tensile elastic modulus | MPa | 160 | 102 | 68 | 74 | 216 | 254 | 98 |
| ultimate strength | MPa | 21 | 23 | 21 | 20 | 20 | 25 | 17 |
| ultimate elongation | % | 870 | 890 | 870 | 910 | 780 | 800 | 920 |
| linear expansion coefficient MD | $10^{-4}$/K | 1.1 | 1.0 | 0.9 | 0.9 | 1.0 | 1.0 | 1.1 |
| TD | $10^{-4}$/K | 1.3 | 1.2 | 1.3 | 1.1 | 1.6 | 1.3 | 1.3 |
| anisotropy | $10^{-4}$/K | 0.2 | 0.2 | 0.4 | 0.3 | 0.6 | 0.3 | 0.2 |

INDUSTRIAL APPLICABILITY

The heterophasic propylene polymerization material of the present invention can be utilized as raw materials of, for example, automobile parts such as automobile interior parts and exterior parts, food and medical containers, furniture and electric appliance parts, civil engineering and construction materials and the like.

The invention claimed is:

1. A heterophasic propylene polymerization material comprising a propylene homopolymer (I-1) or a propylene copolymer (I-2), and an ethylene-α-olefin copolymer (II), the heterophasic propylene polymerization material satisfying all of requirements (i) to (iv):
   (i) an amount of a xylene-soluble component in the heterophasic propylene polymerization material is 45% by weight or more, providing that a total weight of the heterophasic propylene polymerization material is taken as 100% by weight;

(ii) a limiting viscosity $[\eta]_{CXIS}$ of a xylene-insoluble component in the heterophasic propylene polymerization material is 1.50 dL/g or more;

(iii) a ratio of the limiting viscosity $[\eta]_{CXS}$ of the xylene-soluble component in the heterophasic propylene polymerization material to the limiting viscosity $[\eta]_{CXIS}$ of the xylene-insoluble component therein ($[\eta]_{CXS}/[\eta]_{CXIS}$) is 1.5 or less; and (iv) a content of monomer units derived from ethylene and α-olefins having 4 to 12 carbon atoms in the xylene-insoluble component in the heterophasic propylene polymerization material is 6% by weight or more to 16.82% by weight or less, providing that a total weight of the xylene-insoluble component is taken as 100% by weight:

propylene copolymer (I-2) is a propylene copolymer comprising a monomer unit derived from propylene and a monomer unit derived from at least one olefin selected from the group consisting of ethylene and α-olefins having 4 to 12 carbon atoms, wherein a content of the monomer unit derived from at least one olefin selected from the group consisting of ethylene and α-olefins having 4 to 12 carbon atoms is 0.01% by weight or more and less than 20% by weight, provided that the total weight of the propylene copolymer (I-2) is taken as 100% by weight; and ethylene-α-olefin copolymer (II) is an ethylene-α-olefin copolymer comprising a monomer unit derived from ethylene and a monomer unit derived from at least one olefin selected from the group consisting of propylene and α-olefins having 4 to 12 carbon atoms, wherein a content of the monomer unit derived from ethylene is 20% by weight to 80% by weight, provided that a total weight of the ethylene-α-olefin copolymer component (II) is taken as 100% by weight.

2. The heterophasic propylene polymerization material according to claim 1, wherein the content of the monomer unit derived from ethylene in the xylene-soluble component is 20% by weight to 40% by weight, provided that the total weight of the xylene-soluble component is taken as 100% by weight.

3. The heterophasic propylene polymerization material according to claim 1, wherein the limiting viscosity $[\eta]CXIS$ of the xylene-insoluble component is 2.1 dL/g or more.

4. A water-impermeable sheet comprising the heterophasic propylene polymerization material according to claim 1.

* * * * *